(12) United States Patent
Bremer et al.

(10) Patent No.: US 12,446,791 B2
(45) Date of Patent: Oct. 21, 2025

(54) EXTENDED WEAR ELECTRODE BASELINE DETERMINATION FOR WEARABLE DEVICE

(71) Applicant: Welch Allyn, Inc., Skaneateles Falls, NY (US)

(72) Inventors: Edward Bremer, Victor, NY (US); Thaddeus J. Wawro, Auburn, NY (US)

(73) Assignee: Welch Allyn, Inc., Skaneateles Falls, NY (US)

( * ) Notice: Subject to any disclaimer, the term of this patent is extended or adjusted under 35 U.S.C. 154(b) by 916 days.

(21) Appl. No.: 17/245,632

(22) Filed: Apr. 30, 2021

(65) Prior Publication Data

US 2021/0361183 A1   Nov. 25, 2021

Related U.S. Application Data

(60) Provisional application No. 63/028,950, filed on May 22, 2020.

(51) Int. Cl.
*A61B 5/0531* (2021.01)
*A61N 1/04* (2006.01)

(52) U.S. Cl.
CPC .......... *A61B 5/0531* (2013.01); *A61N 1/0484* (2013.01); *A61N 1/0496* (2013.01)

(58) Field of Classification Search
CPC .......... A61B 5/0531; A61B 2560/0223; A61B 2562/14; A61B 5/0535; A61N 1/0484; A61N 1/0496
See application file for complete search history.

(56) References Cited

U.S. PATENT DOCUMENTS

| | | | |
|---|---|---|---|
| 9,089,718 B2 | 7/2015 | Owen et al. | |
| 9,986,930 B2 | 6/2018 | Lane et al. | |
| 10,368,805 B2 | 8/2019 | Qin | |
| 2005/0277991 A1* | 12/2005 | Covey | A61N 1/3931 607/5 |
| 2008/0294060 A1* | 11/2008 | Haro | A61B 5/03 600/538 |
| 2016/0228691 A1* | 8/2016 | Mathew | A61N 1/048 |
| 2017/0080207 A1* | 3/2017 | Perez | A61F 5/0003 |
| 2017/0354372 A1* | 12/2017 | Varadan | A61B 5/282 |
| 2018/0116546 A1 | 5/2018 | Pastoor et al. | |
| 2019/0022400 A1 | 1/2019 | Kumar et al. | |
| 2021/0030304 A1* | 2/2021 | Matic | A61B 5/0531 |

\* cited by examiner

*Primary Examiner* — Christian Jang
*Assistant Examiner* — Meghan R Kumar
(74) *Attorney, Agent, or Firm* — Merchant & Gould P.C.

(57) ABSTRACT

Examples for monitoring impedance of a hydrogel in an electrode. The electrode is applied to a patient to measure impedance through the patient's body. Hydrogel is used to conduct electrical signals between the patient's body and sensing circuitry of the electrode. The impedance of the hydrogel can change over time as the electrode is being worn. When the electrode is applied to a subject, the device measures the impedance of the hydrogel to determine a baseline value. This baseline value can then be used to calculate any necessary impedance corrections over the life of the electrode. Measurements are taken via a separate conductive trace that measures only impedance through the hydrogel and not from the patient's body. This allows for more accurate impedance readings to be taken with the electrode.

20 Claims, 5 Drawing Sheets

EXTENDED WEAR ELECTRODE BASELINE DETERMINATION FOR WEARABLE DEVICE

BACKGROUND

An electrode is used to couple electrical signals from the body into an electronic device, such as a wearable patch. The electrical signals are used by the device to measure impedance and determine a variety of vital signs, such as electrical activity of the heart (ECG/EKG) or neuronal activity of the brain (EEG). The electrode construction includes a hydrogel that provides an electrically conductive path between the device and the wearer's skin. Some wearable devices are designed to be worn for multiple days. The hydrogel chemistry on the electrodes can change over time due to perspiration or drying out. These changes can result in a change in impedance that can be mistaken as a physiological change.

SUMMARY

Embodiments of the disclosure are directed to an extended wear electrode including an additional conductive trace configured to test the impedance of a hydrogel in the electrode to determine if changes in the hydrogel chemistry are affecting the impedance measurements being recorded by the electrode.

In one aspect, an extended wear electrode includes hydrogel disposed on a flexible support. A first conductive trace is printed on the flexible support and is partially embedded in a center portion of the hydrogel. The first conductive trace is configured to detect impedance from a body of a patient when in use. A second conductive trace is printed on the flexible support and is partially embedded in a first side of the hydrogel and a second side of the hydrogel opposite the first side. The second conductive trace is configured to detect impedance through the hydrogel.

In another aspect, a method of monitoring impedance of a hydrogel in an electrode includes measuring a baseline impedance of the hydrogel using a first conductive trace of the electrode. The first conductive trace is partially embedded in a first portion of the hydrogel. Operation of the electrode is initiated to measure physiological impedance through the body using the second conductive trace. The second conductive trace is partially embedded in a second portion of the hydrogel. The impedance of the hydrogel is dynamically measured using the first conductive trace and the physiological impedance measurements are adjusted based on the dynamically measured impedance of the hydrogel.

In yet another aspect, a system for monitoring impedance of an electrode includes an electrode, a processor, and a memory device. The electrode comprises: A flexible support comprising adhesive on a first side; hydrogel disposed at a central portion of the first side of the flexible support; a first conductive trace printed on the first side of the flexible support and partially embedded in a center portion of the hydrogel, the first conductive trace configured to detect impedance from a body of a patient when in use; and a second conductive trace printed on the first side of the flexible support and partially embedded in a first side of the hydrogel and a second side of the hydrogel opposite the first side, the second conductive trace configured to detect impedance through the hydrogel. The memory device includes instructions that when executed by the processor, cause the electrode to: measure a baseline impedance of the hydrogel using the second conductive trace; initiate operation of the electrode to measure physiological impedance through the body using the first conductive trace; periodically measure impedance of the hydrogel using the second conductive trace; and adjust the physiological impedance measurements based on the periodically measured impedance of the hydrogel.

The details of one or more techniques are set forth in the accompanying drawings and the description below. Other features, objects, and advantages of these techniques will be apparent from the description, drawings, and claims.

DETAILED DESCRIPTION

The present disclosure is directed to systems and methods for monitoring impedance of a hydrogel in an electrode. The electrode is configured to be worn on the body of a patient to measure vital signs. For example, the electrode could be utilized in Electrocardiography (ECG/EKG), Electroencephalography (EEG), or Electromyography (EMG).

In other examples, the electrodes are used to measure impedance through the patient's body. Impedance plethysmography or phlebography (IPG) measures small changes in the electrical impedance of a patient's chest. Hydrogel is used to conduct electrical signals between the patient's body and sensing circuitry of the electrode. Impedance measurements can be recorded based on signals received through the hydrogel. The impedance of the hydrogel can change based on the water content of the hydrogel. When the hydrogel's impedance changes, it can affect the impedance measurements taken with the electrode.

Some electrodes are placed for multiple days and changes in the hydrogel need to be taken into account. Methods and systems are provided to ensure that impedance changes measured by the device are physiological and not hydrogel related. When the electrode is applied to a subject, the device measures the impedance of the hydrogel to determine a baseline value. This baseline value can then be used to calculate any necessary impedance corrections over the life of the electrode. Measurements are taken via a separate conductive trace that measures only impedance through the hydrogel and not from the patient's body. This allows for more accurate impedance readings to be taken with the electrode. Details of these methods and systems are provided below.

Figure 1:
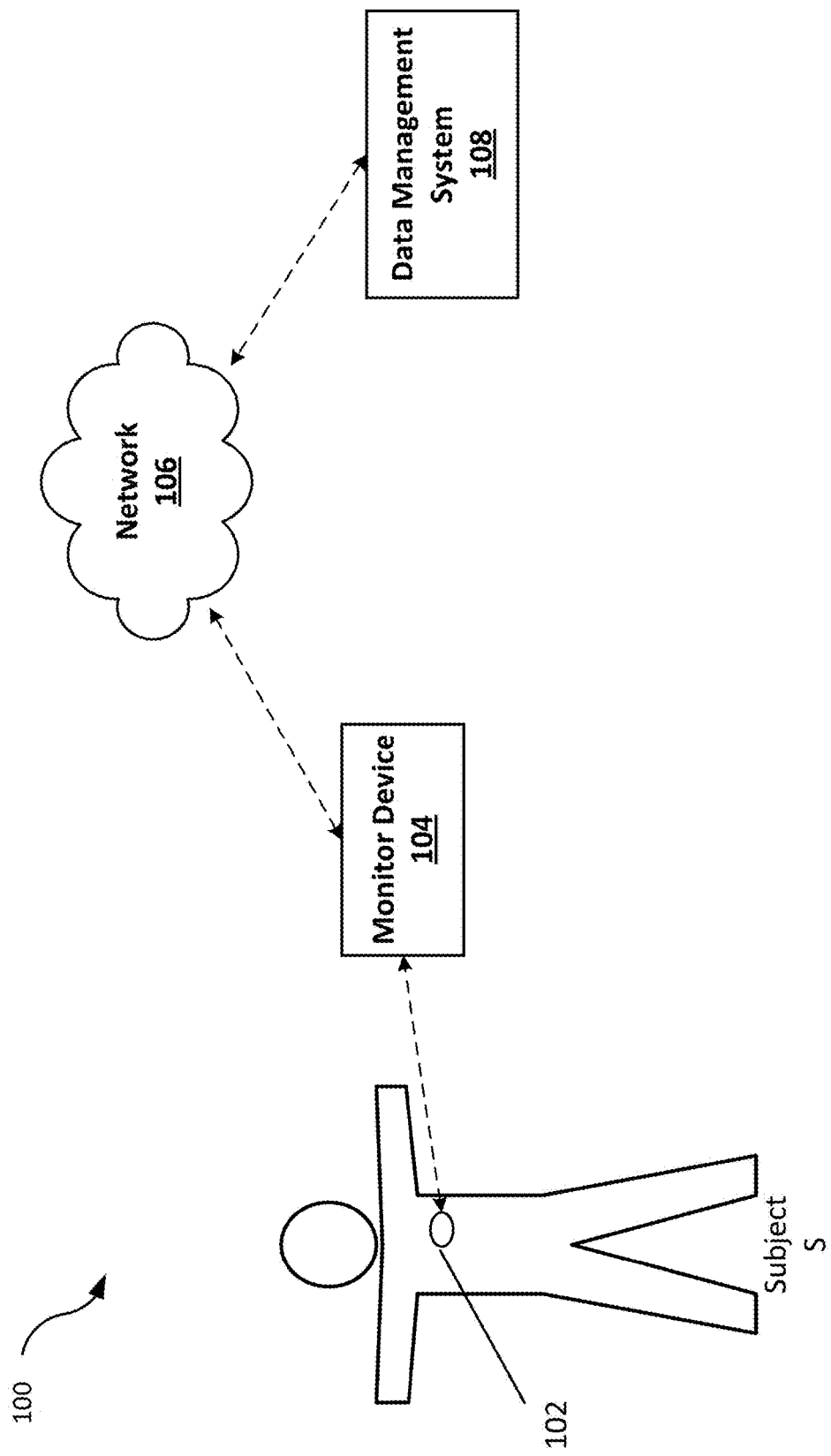
FIG. 1 is a schematic diagram illustrating an example system for monitoring a patient worn electrode.

FIG. 1 is a schematic diagram illustrating a system 100 for monitoring impedance with an electrode. The system 100 can be implemented, for example, at a hospital, clinic, or other healthcare facility. In the example of FIG. 1, the system 100 includes an electrode 102 affixed to the subject S. In some embodiments, the electrode 102 is affixed to skin of the subject S with an adhesive. In some embodiments, the electrode 102 is positioned over the chest of the subject S to record an impedance plethysmogram. The electrode 102 is described in greater detail with respect to FIGS. 2-3.

The electrode 102 is in communication with at least one monitor device 104. The monitor device 104 is a computing device configured to receive information from the electrode 102, process the information, and communicate the information through the network 106 to a data management system 108. In some embodiments, the monitor device 104 is not needed and the electrode 102 communicates directly with the data management system 108. Data from the electrode 102 can be communicated via a wired connection or a wireless connection to the data management system 108 or the monitor device 104. In some embodiments, the monitor device 104 is a computing device including a display that can be used to view vital signs data for the patient. One example of a monitor device is the Connex® Vital Signs Monitor (Welch Allyn Inc., Skaneateles Falls, NY).

The network 106 operates to mediate communication of data between network-enabled computing systems. In various embodiments, the network 106 includes various types of communication links. For example, the network 112 can include wired and/or wireless links, including cellular, Bluetooth, ultra-wideband (UWB), 802.11, ZigBee, and other types of wireless links. The network 106 can include one or more routers, switches, mobile access points, bridges, hubs, intrusion detection devices, storage devices, standalone server devices, blade server devices, sensors, desktop computers, firewall devices, laptop computers, handheld computers, mobile telephones, vehicular computing devices, and other types of computing devices.

The data management system 108 operates to manage health information for one or more patients within a healthcare facility or system. In some embodiments, the data management system 108 operates to receive data from the monitor device 104 store that information. One example of a data manage system 108 is the Connex® data management systems (Welch Allyn Inc., Skaneateles Falls, NY).

In some embodiments, the data management system 108 is an electronic medical record (EMR) system that operates to record information relevant to the medical history of each patient. Examples of information that might be stored in a patient's EMR includes lab results, surgical history, family medical history, current medications, and previous medical diagnoses. Examples of electronic medical records systems include those developed and managed by Epic Systems Corporation, Cerner Corporation, Allscripts, and Medical Information Technology, Inc. (Meditech).

Figure 2:
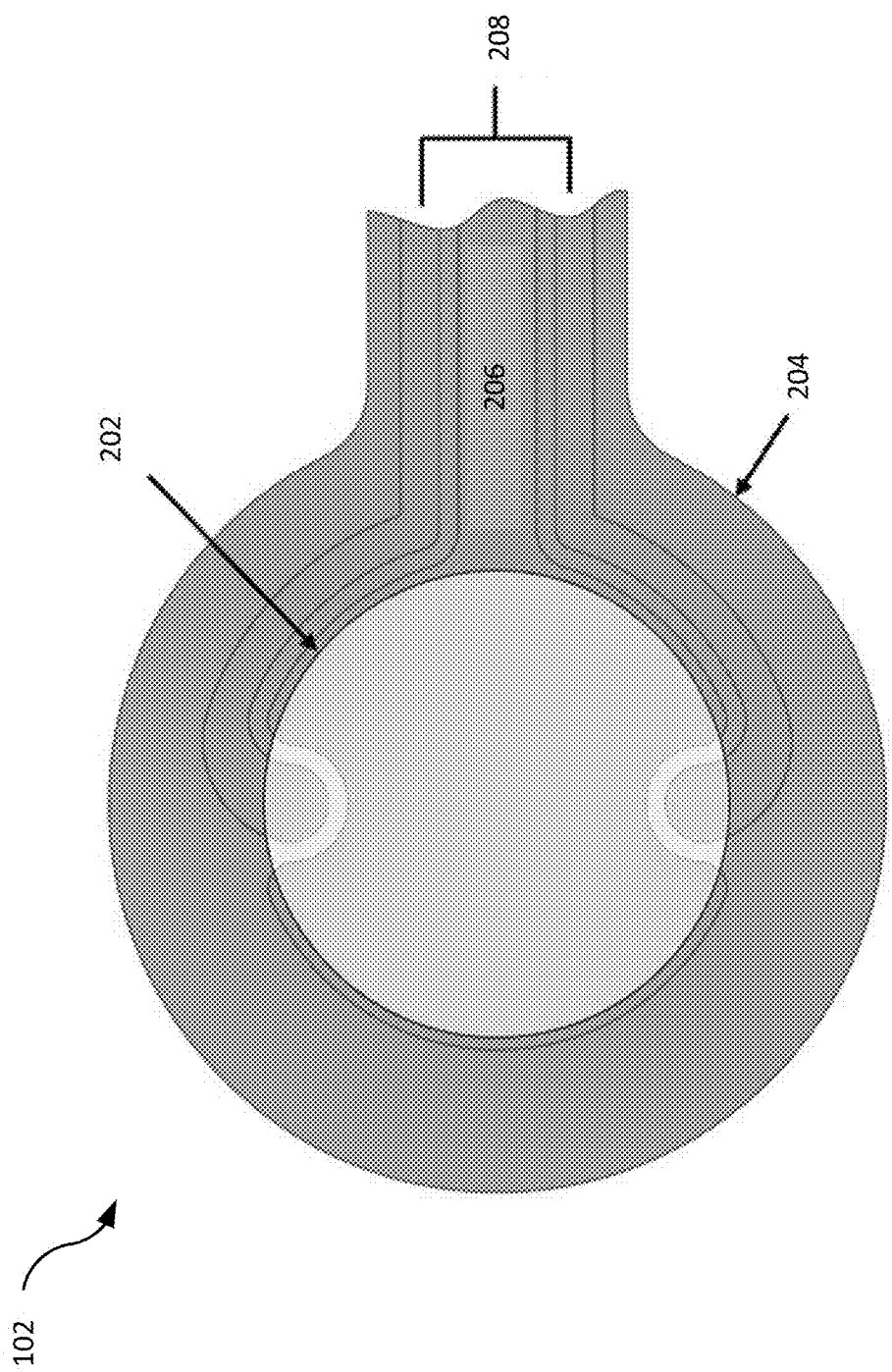
FIG. 2 is a diagram of the electrode.

FIG. 2 is a diagram of an example electrode 102. Hydrogel 202 is positioned at the center of an adhesive label 204 that serves as a support structure. An impedance trace 206 and gel resistance trace 208 are printed on the label 204 and are partially embedded in the hydrogel 202.

The hydrogel 202 is shown in FIG. 2 as being circular. Other shapes and configurations are possible. The hydrogel 202 serves as an electrical conductor between the conductive traces and the skin of a patient. Hydrogel is a three-dimensional network of hydrophilic cross-linked polymers that are capable of holding large amounts of water. Over time, the chemistry of the hydrogel 202 can change due to perspiration or drying out. As the chemistry changes, the resistance or impedance of the hydrogel also changes.

The label 204 operates as a support structure for the other components of the electrode 102 and holds everything in place on the patient. In some embodiments, the label 204 is laminated to adhesive foam which encapsulates the hydrogel 202. The label 204 can be made of many flexible materials including polyethylene foam, fabric, polyolefin, and vinyl. In some embodiments, the label is made of polyester.

The impedance trace 206 is a conductive trace that connects sensing devices (not shown) to the hydrogel 202. The electrical signals traveling through the impedance trace 206 are used by the sensing devices to measure impedance through the patient's body. In some embodiments, the conductive traces are printed with silver-silver chloride (Ag— AgCl) ink.

The gel resistance trace 208 is printed of the same or similar material as the impedance trace 206. The gel resistance trace 208 creates a bridge network with the hydrogel 202 to measure resistance (impedance) of an electrical signal through the hydrogel 202. The gel resistance trace 208 forms a completely separate circuit from the impedance trace 206. The impedance measurement is used to provide a baseline of the hydrogel. As the hydrogel breaks down with use, the impedance will change. This can be measured over time to determine how the impedance measurements should be adjusted to maintain accuracy.

Figure 3:
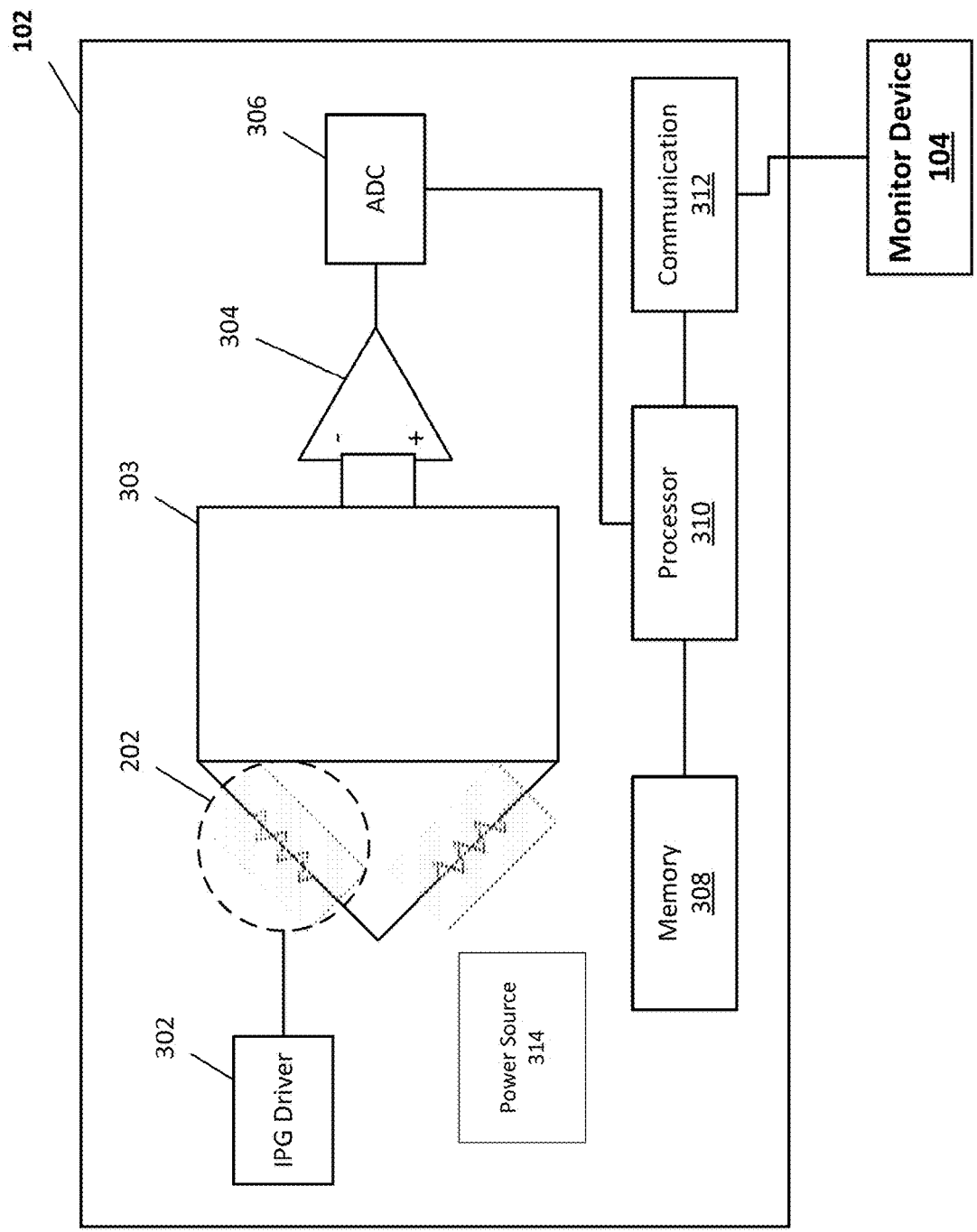
FIG. 3 is a schematic diagram illustrating the electrode.

FIG. 3 is schematic diagram of an example electrode 102. The hydrogel 202 forms part of a bridge network 208 of resistors. An analog switch 301 is added to an impedance plethysmography (IPG) driver 302 to route drive and sense nodes to the hydrogel 202 connection. The bridge network 303 connects to an operational amplifier (op-amp) 304 and analog to digital converter (ADC) 306 to measure signal levels of impedance. The electrode 102 also includes a memory device 308, a processor 310, and a communication device 312.

The IPG driver 302 operates to control functionality of the electrode that is responsible for measuring impedance of the body. The IPG driver 302 is electrically connected to the hydrogel 202.

The bridge network 303 includes four resistors, one of which is the hydrogel 202. The bridge network 303 operates to measure impedance and resistance.

The op-amp 304 is a voltage amplifying device that is in connection with the bridge network 303.

The analog to digital converter (ADC) 306 operates to converts an analog signal from the op-amp 304 into a digital signal that is processed by the processor 310.

The memory 308 operates to store instructions that are executed by the processor 310. The instructions include methods for operating the electrode and processing the outputs from the electrode. The instructions can also include steps for communicating data from the electrode to other devices via the communication device 312.

The communication device 312 operates to send and receive information from other devices. For example, the electrode 102 could communicate data to the monitor device 104. Communication can be transmitted through wired or wireless means.

In some embodiments, the electrode 102 includes a power source (not shown). The power source could be a power cord with a plus configured to draw power from an electrical outlet. Alternatively, the power source could be a battery.

Figure 4:
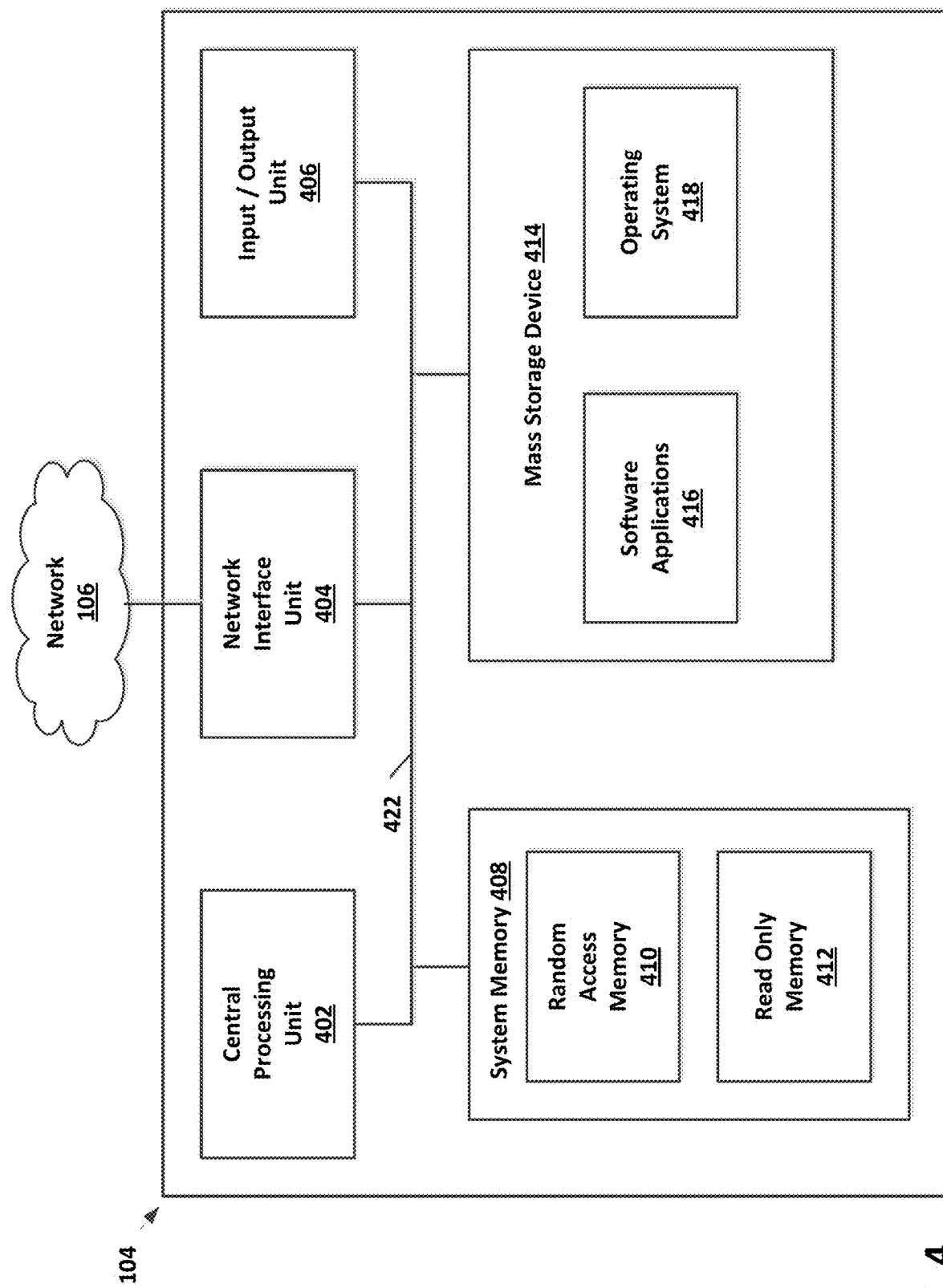
FIG. 4 is a block diagram illustrating example components of a computing device usable in the system of FIG. 1.

FIG. 4 is a block diagram illustrating an example of the physical components of the monitor device 104. The components also could be implemented in various other devices of the system 100 for monitoring impedance. For instance, the depicted components can also be incorporated into other devices described herein, such as the sensor 102 or the data management system 108.

In the example shown in FIG. 4, the monitor device 104 includes at least one central processing unit ("CPU") 402, a system memory 408, and a system bus 422 that couples the system memory 408 to the CPU 402. The system memory 408 includes a random access memory ("RAM") 410 and a read-only memory ("ROM") 412. A basic input/output system that contains the basic routines that help to transfer information between elements within the monitor device 104, such as during startup, is stored in the ROM 412. The monitor device 104 further includes a mass storage device 414. The mass storage device 414 is able to store software instructions and data.

The mass storage device 414 is connected to the CPU 402 through a mass storage controller (not shown) connected to the system bus 422. The mass storage device 414 and its associated computer-readable storage media provide non-volatile, non-transitory data storage for the monitor device 104. Although the description of computer-readable storage media contained herein refers to a mass storage device, such as a hard disk or solid state disk, it should be appreciated by those skilled in the art that computer-readable data storage media can include any available tangible, physical device or article of manufacture from which the CPU 402 can read data and/or instructions. In certain embodiments, the computer-readable storage media comprises entirely non-transitory media.

Computer-readable storage media includes volatile and non-volatile, removable and non-removable media implemented in any method or technology for storage of information such as computer-readable software instructions, data structures, program modules or other data. Example types of computer-readable data storage media include, but are not limited to, RAM, ROM, EPROM, EEPROM, flash memory or other solid state memory technology, CD-ROMs, digital versatile discs ("DVDs"), other optical storage media, magnetic cassettes, magnetic tape, magnetic disk storage or other magnetic storage devices, or any other medium which can be used to store the desired information and which can be accessed by the monitor device 104.

According to various embodiments, the monitor device 104 can operate in a networked environment using logical connections to remote network devices through a network 106, such as a wireless network, the Internet, or another type of network. The monitor device 104 may connect to the network 106 through a network interface unit 404 connected to the system bus 422. It should be appreciated that the network interface unit 404 may also be utilized to connect to other types of networks and remote computing systems. The monitor device 104 also includes an input/output controller 406 for receiving and processing input from a number of other devices, including a touch user interface display screen, or another type of input device. Similarly, the input/output controller 406 may provide output to a touch user interface display screen or other type of output device.

As mentioned briefly above, the mass storage device 414 and the RAM 410 of the monitor device 104 can store software instructions and data. The software instructions include an operating system 418 suitable for controlling the operation of the monitor device 104. The mass storage device 414 and/or the RAM 410 also store software instructions, that when executed by the CPU 402, cause the monitor device 104 to provide the functionality discussed in this document.

Figure 5:
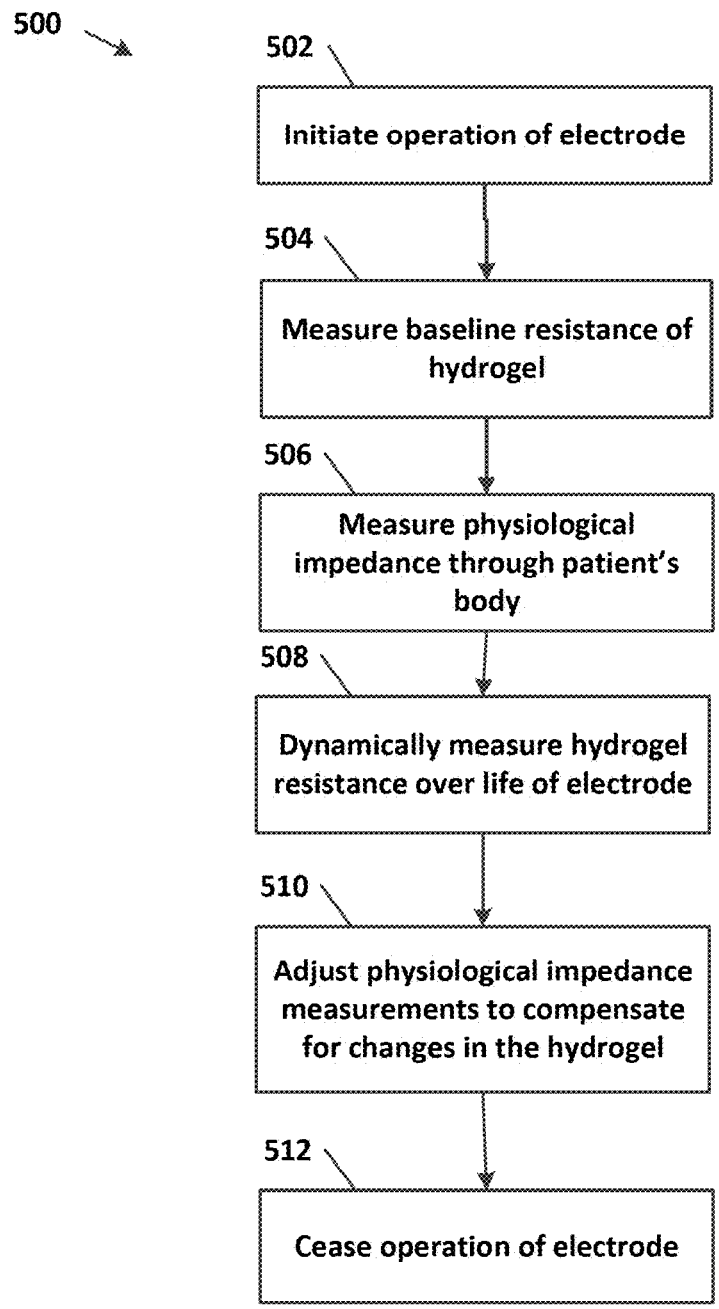
FIG. 5 is a flow chart illustrating an example method of monitoring impedance of a hydrogel in an electrode.

Turning now to FIG. 5, a method 500 of monitoring impedance of an electrode is described. In some embodiments, this method 500 is performed by the system 100 of FIG. 1 to monitor the electrode 102.

At operation 502, operation of an electrode is initiated when the electrode is applied to a patient. Hydrogel in the electrode comes into contact with the patient's skin. Adhesive on the label of the electrode holds the electrode in place on the patient. A power source is connected to the electrode and activated.

At operation 504, a baseline reading of impedance through the hydrogel is measured. An electrical signal is sent through the bridge network 303 and measurements are received at the ADC 306. The processor determines a measurement of impedance through the hydrogel 202 based on the output of the ADC 306. This is established as the initial baseline for the hydrogel.

At operation 506, physiological impedance through the patient's body is measured. Impedance readings are taken with the impedance trace 206 from the patient's body and through the hydrogel 202. The IPG driver 302 initiates the impedance measurements. In some embodiments, the electrode is used for impedance plethysmography.

At operation 508, hydrogel impedance is dynamically measured over the life of the electrode. Impedance readings are taken with the gel resistance trace 206 through the hydrogel 202. For purposes of this description, the life of the electrode is the duration of time that the electrode is affixed to a patient and in use for taking readings. In some embodiments, the life of the electrode is from 1 to 30 days. In some embodiments, the life of the electrode is from 2 to 8 days, from 7 to 15 days, from 12 to 20 days, or from 18 to 25 days. In some embodiments, the life of the electrode is from 2 to 24 days, 3 to 15 days, 4 to 10 days, or 5-7 days. In some embodiments, measurements of hydrogel impedance are taken every 24 hours. In some embodiments, impedance measurements are taken every 6 to 48 hours, every 12 to 36 hours, or every 18 to 24 hours.

At operation 510, physiological impedance measurements are adjusted to compensate for changes in the hydrogel. As changes in the hydrogel impedance are recorded using the gel resistance trace 208, the impedance measurements taken by the impedance trace 206 can be adjusted by the processor 310 to account for any changes in the chemistry of the hydrogel 202.

At operation 512, operation of the electrode is ceased and the electrode is removed from the patient. This could be due to the hydrogel no longer being operational or because the electrode is no longer needed.

Although various embodiments are described herein, those of ordinary skill in the art will understand that many modifications may be made thereto within the scope of the present disclosure. Accordingly, it is not intended that the scope of the disclosure in any way be limited by the examples provided.

What is claimed is:

1. An extended wear electrode, comprising:
   hydrogel disposed on a support structure;
   a first conductive trace printed on the support structure and partially embedded in a center portion of the hydrogel, the first conductive trace configured to detect impedance from a body of a patient when in use; and
   a second conductive trace printed on the support structure and partially embedded in a first side of the hydrogel and a second side of the hydrogel opposite the first side, the second conductive trace configured to detect resistance through the hydrogel independently of the impedance from the body of the patient.

2. The electrode of claim 1, wherein the support structure is a label having adhesive surrounding the hydrogel.

3. The electrode of claim 1, wherein the conductive traces comprise silver-silver chloride ink.

4. The electrode of claim 1, further comprising an impedance plethysmography driver electrically connected to the hydrogel.

5. The electrode of claim 1, further comprising an operational amplifier and analog to digital converter.

6. The electrode of claim 1, further comprising a memory device and a processor.

7. A method of monitoring impedance of a hydrogel in an electrode, the method comprising:
   measuring a baseline resistance of the hydrogel using a first conductive trace of the electrode, the first conductive trace partially embedded in a first portion of the hydrogel;
   initiating operation of the electrode to measure physiological impedance through a body of a patient using a second conductive trace, the second conductive trace partially embedded in a second portion of the hydrogel;
   dynamically measuring resistance of the hydrogel using the first conductive trace independently of the physiological impedance measured through the body of the patient; and
   adjusting the physiological impedance measurements based on the dynamically measured resistance of the hydrogel.

8. The method of claim 7, wherein the electrode is in communication with a monitor device configured to analyze impedance measurements.

9. The method of claim 7, wherein the electrode further comprises a memory device and a processor.

10. The method of claim 7, wherein the electrode further comprises an operational amplifier and analog to digital converter.

11. The method of claim 7, wherein the electrode further comprises a label with adhesive to secure the electrode to skin of the patient.

12. The method of claim 7, further comprising applying the electrode to the patient before initiating operation of the electrode.

13. The method of claim 7, further comprising ceasing operation of the electrode and removing the electrode from the patient.

14. The method of claim 13, wherein ceasing operation occurs in response to determining that the hydrogel is no longer operational.

15. A system for monitoring impedance of an electrode, the system comprising:
   an electrode comprising:
      a support structure comprising adhesive on a first side;
      hydrogel disposed at a central portion of the first side of the support structure;
      a first conductive trace printed on the first side of the support structure and partially embedded in a center portion of the hydrogel, the first conductive trace configured to detect impedance from a body of a patient when in use; and
      a second conductive trace printed on the first side of the support structure and partially embedded in a first side of the hydrogel and a second side of the hydrogel opposite the first side, the second conductive trace configured to detect impedance through the hydrogel independently of the impedance from the body of the patient;
   a processor; and
   a memory device comprising instructions, that when executed by the processor, cause the electrode to:
      measure a baseline impedance of the hydrogel using the second conductive trace;
      initiate operation of the electrode to measure physiological impedance through the body using the first conductive trace;
      periodically measure impedance of the hydrogel using the second conductive trace; and
      adjust the physiological impedance measurements based on the periodically measured impedance of the hydrogel.

16. The system of claim 15, further comprising a monitor device configured to receive the adjusted physiological impedance measurements, display the adjusted physiological impedance measurements on a display device, and communicate the adjusted physiological impedance measurements to a data management system.

17. The system of claim 15, wherein the periodic measurements are taken every 12 to 48 hours.

18. The system of claim 15, wherein the periodic measurements are taken every 24 hours.

19. The system of claim 15, further comprising an impedance plethysmography driver electrically connected to the hydrogel.

20. The system of claim 15, further comprising an operational amplifier and analog to digital converter.

* * * * *